United States Patent Office 3,079,439
Patented Feb. 26, 1963

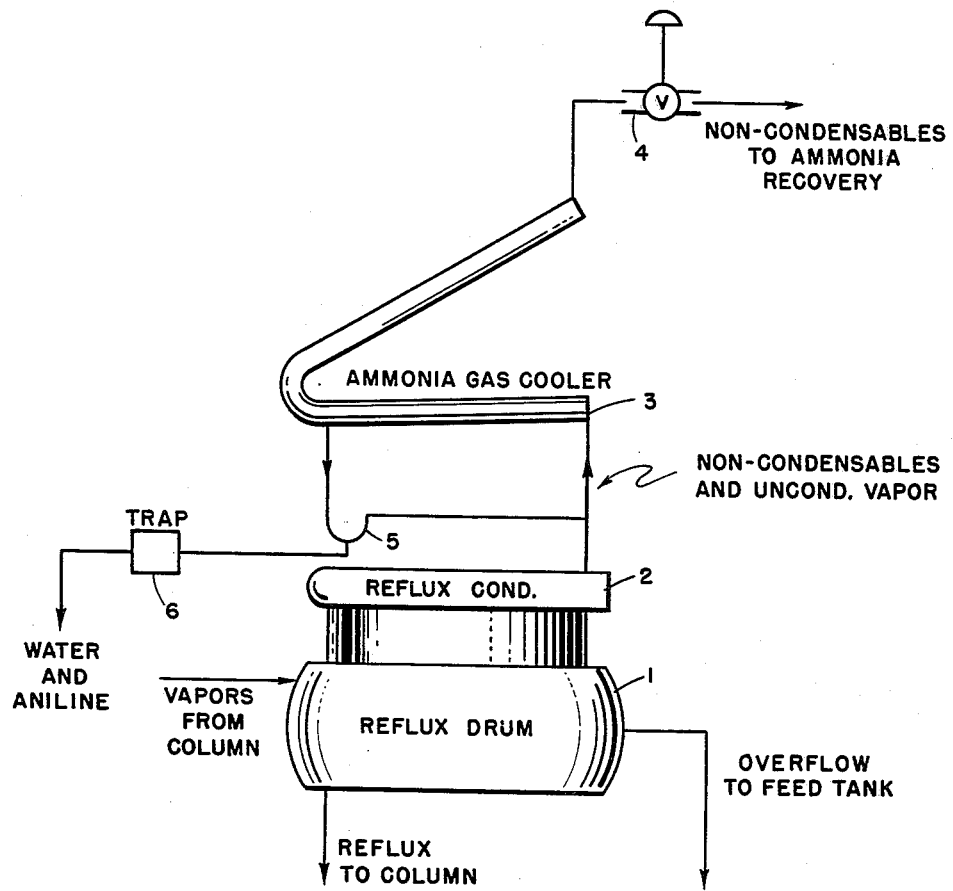

3,079,439
DIPHENYLAMINE PROCESS
Allen G. Potter, Jr., Somerville, N.J., assignor to American Cyanamid Company, New York, N.Y., a corporation of Maine
Filed Feb. 18, 1960, Ser. No. 11,405
7 Claims. (Cl. 260—576)

This invention relates to an improved process for the vapor phase deamination of aniline to diphenylamine. For purposes of simplification, diphenylamine throughout the remainder of this specification is referred to as DPA, its customary abbreviation in the industry.

Deamination of aniline in the vapor phase to produce DPA is illustrated for example in U.S. Patent No. 2,098,039, British Patent No. 752,859 or French Patent No. 1,108,171. Although proposals to employ base-exchange catalysts at below 400° C. are noted therein, the process described in these patents is not concerned therewith.

Essentially, the process disclosed therein involves preheating aniline, passing it through a converter, usually a tubular converter, in contact with a non-base-exchanging deamination catalyst, such as an aluminum or titanium dioxide, at an elevated temperature above about 400° C. Although use of somewhat elevated pressures are noted, operation is preferably at superatmospheric pressure. Reaction temperature normally is maintained by the addition of heat to the converter, usually by passing hot gases over the tubes. This represents a desirable continuous process for producing DPA.

However, such a process, while continuous, does not produce a very high conversion of aniline to DPA in a single pass through the converter. Therefore, it becomes necessary after each pass to remove the DPA product and the by-product ammonia and then recycle the unreacted aniline. Usually this is effected by cooling the out gases from the converter, preferably in two stages. The first stage is to a temperature in the range at which most of the aniline remains vaporized and DPA condenses out. Then the aniline vapors are cooled further to a temperature at which aniline condenses but ammonia and other more volatile by-products remain in the vapor phase. Ammonia is recovered in a suitable absorber and the condensed liquid aniline is recycled. In each of the two cooling stages, i.e., DPA condensation and aniline condensation, it is customary to use conventional fractionating columns with reflux.

The catalyst in a DPA converter has a limited operating cycle. Decomposition products, which are usually carbonaceous and are often referred to as coke, deposit on the catalyst. After a certain time, the catalyst loses its activity and it is necessary to regenerate it. Regeneration is usually done in the same converter by passing hot air instead of aniline through the tubes. This burns off the coke, and the converter, with its regenerated catalyst, can then be put back on stream. Of course, the usual plant has a plurality of converters so that operation is not interrupted when a converter must be cut off stream for catalyst regeneration.

A DPA process such as that described above presents certain problems. Conversion per pass is low, dropping down to as low as 3%. This not only increases the cost but the high recycle rate introduces a second problem. A larger content of by-products condensed with aniline in each cycle is more rapidly built up in the recycled aniline.

Among such by-products is phenol, presumably formed by reaction of aniline with moisture in the gases. It is not possible to avoid moisture completely because commercial aniline is not completely anhydrous. Furthermore, unless absolutely dry air is used, a certain amount of moisture is introduced into the catalyst in the regenerating step. From all of these sources of moisture, the water content of the aniline in the system can build up to quite an appreciable content at which the amount removed in the phenol by-product balances the amount of water introduced from the various possible sources. This, in a typical operation, may amount to from 10,000 to 20,000 p.p.m. with a phenol content of about the same order of magnitude.

According to the process of the present invention, water is trapped and removed from the system without permitting any significant amount to be recycled. This has been found to be a highly important factor. Not only are losses due to by-product phenol formation reduced, but quite surprisingly, the DPA yield per pass is increased very markedly. Under favorable circumstances, it is possible to nearly double the conversion per pass. This results in very marked savings since the output obtainable from any given equipment is also nearly doubled.

Another important factor in the process of the present invention is the removal to a large extent of another by-product, alpha-picoline. It has been found that the latter, by a mechanism which is not as yet fully understood, has an undesirable effect in reducing the activity of the catalyst. Though the invention is not limited to any theory, it is possible that the basic heterocycle neutralizes acid-active centers on the catalyst. This reduced activity or partial poisoning of the catalyst occurs even at temperatures over 400° C. but is destroyed on normal regeneration at higher temperatures. The boiling point of alpha-picoline is sufficiently close to that of aniline that in previous procedures of condensing and recycling aniline separation normally does not take place. However, alpha-picoline forms a low-boiling azeotrope with water. In the present invention, water in the traps results in alpha-picoline, as its low-boiling azeotrope, along with ammonia and other volatiles, being separated from the condensing aniline. The small amounts of alpha-picoline and/or water which are condensed with aniline are, as a result, well below the tolerance therefor. Moreover, a build up of these materials in the recycled aniline is thereby prevented.

Where a good deal of water must be removed, as in the case of high ambient humidity, sufficient water may be condensed to effect satisfactory removal of alpha-picoline. In many cases, however, this condition will not be found. In such cases it is desirable to add water to the traps to insure a satisfactory reduction of alpha-picoline content.

A further substantial increase in conversion results although the improvement is not as big as that obtained from removing water and hence phenols. However, the long-term effect of alpha-picoline on the catalyst is very serious. Economically, it is just as important to keep the alpha-picoline content low as to remove water. It is an advantage of the invention that both of these important improvements are effected concurrently by the same equipment.

While it is necessary to have sufficient water in the traps, water in the catalyst is undesirable. Therefore, the use of dried air in catalyst regeneration is advantageous. Accordingly, the preferred embodiment of the invention employs dry air for regeneration and supplies the necessary additional water for reduction of alpha-picoline content in the traps. The invention will be illustrated in connection with the drawing which is a diagrammatic representation of equipment used in the process and illustrates a typical water-removing system or means.

Since the operation and design of the columns used in aniline stripping and in aniline condensation is in no way changed by the present invention, they are not shown in the drawing. The latter shows a reflux drum 1 which is connected to an aniline condensing column of conventional design. Vapors from the column flow into this drum and are condensed in the reflux condenser. A portion of the condensed liquid is refluxed to the column as indicated, and the remaining liquid overflows to be recycled back to the feed tank.

The reflux tank is maintained at a temperature, by means of reflux condenser 2, sufficiently high so that the major portion of water vapor remains uncondensed and passes into ammonia gas cooler 3 where a mixture of water and aniline flows down into the seal 5 and thence into a trap 6. The volatiles, such as ammonia and other low-boiling constituents, are discharged through a suitable pressure-regulating valve 4 to the ammonia-recovering system. The latter is not shown as it is the conventional one used with DPA systems. Water and aniline from trap 6 is not returned to the aniline feed tank. It is separately treated in a known manner to reduce the water content of the aniline to a level satisfactory for a technical grade of aniline. This operation per se forms no portion of the present invention.

Operation of the reflux condenser and the temperature of the aniline condensate, i.e., the temperature in the reflux tank, will depend on the pressure under which the aniline condensing column is being operated. This pressure is usually coordinated with that in the preceding and/or succeeding steps. However, this is not necessarily so and therefore the operating pressure may vary from operation under reduced pressures as low as 25–50 p.s.i. to a positive pressure as high as some 225–250 p.s.i.

The boiling point of aniline will vary accordingly from as low as some 150°–160° C. through about 184°–185° C. at atmospheric pressure, to as high as about 250° C. Ordinarily the extremes, particularly the higher pressures and temperatures, will seldom be encountered. In most operations the column pressure will be above atmospheric and in the range over which aniline boils at from about 200° to about 230° C. Whatever the pressure being used on the column, which determines the corresponding boiling point of aniline, the condensate temperature in the reflux drum should be from about 2° to about 10° C. below the boiling point of aniline at the selected pressure. Usually from about 3°–6° C. below the boiling point will be found to constitute good practice.

Although the above noted patents set forth an operating temperature in the converter described as above 400° C., patentees indicate a temperature of some 450° C. is usually considered preferable. In the practice of the present invention, temperatures above 400° C. also may be used. However, in general, temperatures of from above about 450° C. to about 550° C. are preferred. For most operations the optimum reaction temperature will be found between about 475° C. and about 500° C., with some 480°–500° C., representing good general practice.

Similarly, the above noted patents mentioned that superatmospheric pressures may be used. However, they also state that converter pressures above those required to overcome back pressure so as to discharge at about atmospheric pressure offer no special advantage and should be generally avoided. In the practice of the present invention, however, the operating pressure is preferably from about 40 to about 250 p.s.i.g. and a good general practice is considered to be the use of pressures in the range from about 90 to about 130 p.s.i.g.

Use of the oxides of titanium and aluminum as catalysts and the use of the above-noted preferred converter temperatures and pressures are not per se novel with this invention.

The present invention will be more fully illustrated in conjunction with the following examples which give typical operating conditions.

*Example 1*

Aniline containing not more than 500 p.p.m. water was vaporized and reacted by passing the vapors over an alumina catalyst in a tubular DPA converter at 480° C. and approximately 100 p.s.i. Vapors from the reflux drum in the aniline condensing zone were passed through water separation equipment as described above in conjunction with the drawing. Condensed aniline being recycled contained less than 500 p.p.m. of water. Average results over 24-hour operation in a large plant gave a phenol concentration of 0.068% and water of about 0.05%. Conversions of aniline to DPA averaged 5% per pass.

*Example 2*

To illustrate the effect of water removal, the procedure was repeated in the same converter with the same aniline feed and under the same reaction conditions except that water was not removed in condensing and recycling the aniline. Average results over a 24-hour operation gave a phenol concentration of 1.43% and a water concentration varying from 1% to 2%. Conversions of aniline to DPA varied from 2.8 to 2.9% per pass.

*Example 3*

Spent catalyst in the converter as used in Example 1 was regenerated at 480° C. with air having a dew point of 84° F. After catalyst regeneration was complete, aniline vapor containing about 500 p.p.m. of water was passed through at 480° C. and 100 p.s.i. as described in Example 1. After four hours of operation the water content in the condensed aniline averaged 500 p.p.m. Water removed from the catalyst, both as phenol and water, was equivalent to 0.25% of the catalyst weight.

*Example 4*

The same operation as in Example 3 was repeated but using in the regeneration dry air having a dew point of minus 47° F. and aniline feed was used containing 1,000 p.p.m. water. After four hours the same water and phenol content was reached but water was given up to the catalyst equal to approximately 1.0% of the catalyst weight.

From these examples, it will be noted that when dry air is used for regeneration the catalyst has drying capacity so that in the initial hours, even though wetter aniline is used, the desirable low water content is maintained.

*Example 5*

To show actual water absorption or desorption by the catalyst, the procedure of Example 3 was repeated. When the regenerating air had a dew point of minus 10° F., the catalyst adsorbed 13.5 parts of water from the aniline during one converter cycle. When regeneration was effected with air having a dew point of 80° F., corresponding to summer conditions, the catalyst desorbed 3.6 parts of water to the gas stream during a conversion cycle of the same period.

*Example 6*

Operation as described in Example 1 is repeated except that water is introduced into the aniline reflux drum to maintain sufficient water therein to effect the maximum removal of alpha-picoline. As pointed out above, the amount of water added will depend on the water content of the aniline and other factors. The water-alpha-picoline-aniline mixture is drained from trap 6 and analyzed. It has the following approximate composition:

| | Percent |
|---|---|
| Water | 20–25 |
| Alpha-picoline | 5 |
| Aniline | 70–75 |

For purposes of comparison, the results of the operation of Examples 2, 1 and 6 respectively are summarized in the following table.

| Condition | Content¹—Recycled aniline | | | 24 hr. conversion, percent |
|---|---|---|---|---|
| | Phenol | Water | Alpha-picoline | |
| No traps | 1.43 | 1-2 | Unknown | 2.8-2.9 |
| Traps | 0.068 | 0.05 | 2.0 | 5.0 |
| Trap and water | 0.068 | 0.05 | 0.5-0.7 | 5.5 |

¹ Percent by weight.

It will be noted that when there is no water removal through traps, as in Example 1, there is a high concentration of phenols and water circulated. In succeeding cycles it will increase. There is also a high concentration of alpha-picoline but it was not determined in the operation of Example 2 without traps since this was not an operation within the invention. It will be seen that when water is added to the trap there is no significant change in the amount of phenols and water in the recycled aniline. However, the alpha-picoline content is reduced by a factor of about 4, resulting in an additional 10% improvement in conversion. There is also a long-time effect on reducing the poisoning of the catalyst. This is not reflected in a 24-hour test but is of importance in a continuous operation of a plant.

As such this application constitutes a continuation-in-part of my copending application Serial No. 702,729, filed December 13, 1957 which in turn was a continuation of my application copending therewith, Serial No. 610,560, filed September 18, 1956; both of which applications are now abandoned.

I claim:

1. In the continuous production of diphenylamine in the vapor phase under superatmospheric pressure, including the steps of a catalytic deamination, by passing prevaporized aniline over a metal oxide deamination catalyst therefor, at a reaction temperature above about 400° C., whereby a reacted vapor mixture comprising diphenylamine, aniline, alpha-picoline, ammonia and water is obtained;

a diphenylamine condensation, by partially cooling said vapor mixture only to about the condensation temperature of diphenylamine, whereby liquid diphenylamine is condensed therefrom; and an aniline condensation, by further partially cooling the residual gases in a reflux column only to about the condensation temperature of aniline, whereby a condensate comprising aniline, alpha-picoline and water is obtained;

the improvement of:

during said aniline condensation, simultaneously (a) maintaining the reflux condensate at a temperature in the range of from about 150° C. to about 250° C., said temperature being from about 2° to about 10° C. below the boiling point of aniline at the pressure on the aniline condenser;

(b) mantaining the total water-content in the vapor phase in contact with the liquid condensate and in the condensate sufficiently high to form in the vapor phase with the major portion of said alpha-picoline its azeotrope with water, whereby said major portion of said alpha-picoline is separated from the condensed aniline; and (c) removing a vapor mixture comprising ammonia, water, water-picoline azeotrope and aniline vapors from said vapor phase at a rate such that the ammonia content in said vapor phase remains substantially constant;

and removing from said liquid phase resultant liquid aniline of reduced water and alpha-picoline content.

2. A process according to claim 1 wherein said condensate temperature is from about 3° to about 6° below said boiling point of aniline.

3. A process according to claim 1 including the additional steps of further cooling said removed vapors to a temperature at which substantially all the condensable vapors are converted to liquid, removing resultant liquid from the circuit and removing residual, non-condensables from the circuit.

4. A process according to claim 1 in which water from an external source is added to said liquid phase during said aniline condensation step at a rate sufficient to maintain said water content.

5. A process according to claim 1 in which the deamination catalyst is periodically regenerated by burning out combustible impurities with air, said air being dehydrated at least to the point where, on reuse of the regenerated catalyst, no water is desorbed to the reaction gas stream.

6. A process according to claim 5 in which said deamination is effected under a pressure of from about 90 to about 130 p.s.i.

7. A process according to claim 1 in which said deamination is effected under a pressure of from about 90 to about 130 p.s.i.

References Cited in the file of this patent

UNITED STATES PATENTS

| 1,308,356 | Houlehan | July 1, 1919 |
| 1,314,538 | Rogers | Sept. 2, 1919 |
| 1,422,494 | Tanberg | July 11, 1922 |
| 2,098,039 | Hill et al. | Nov. 2, 1937 |
| 2,514,430 | Webb et al. | July 11, 1950 |